Feb. 12, 1935.  M. FIELDMAN  1,991,201
HYDRAULIC SHOCK ABSORBER
Filed July 7, 1930  3 Sheets-Sheet 1
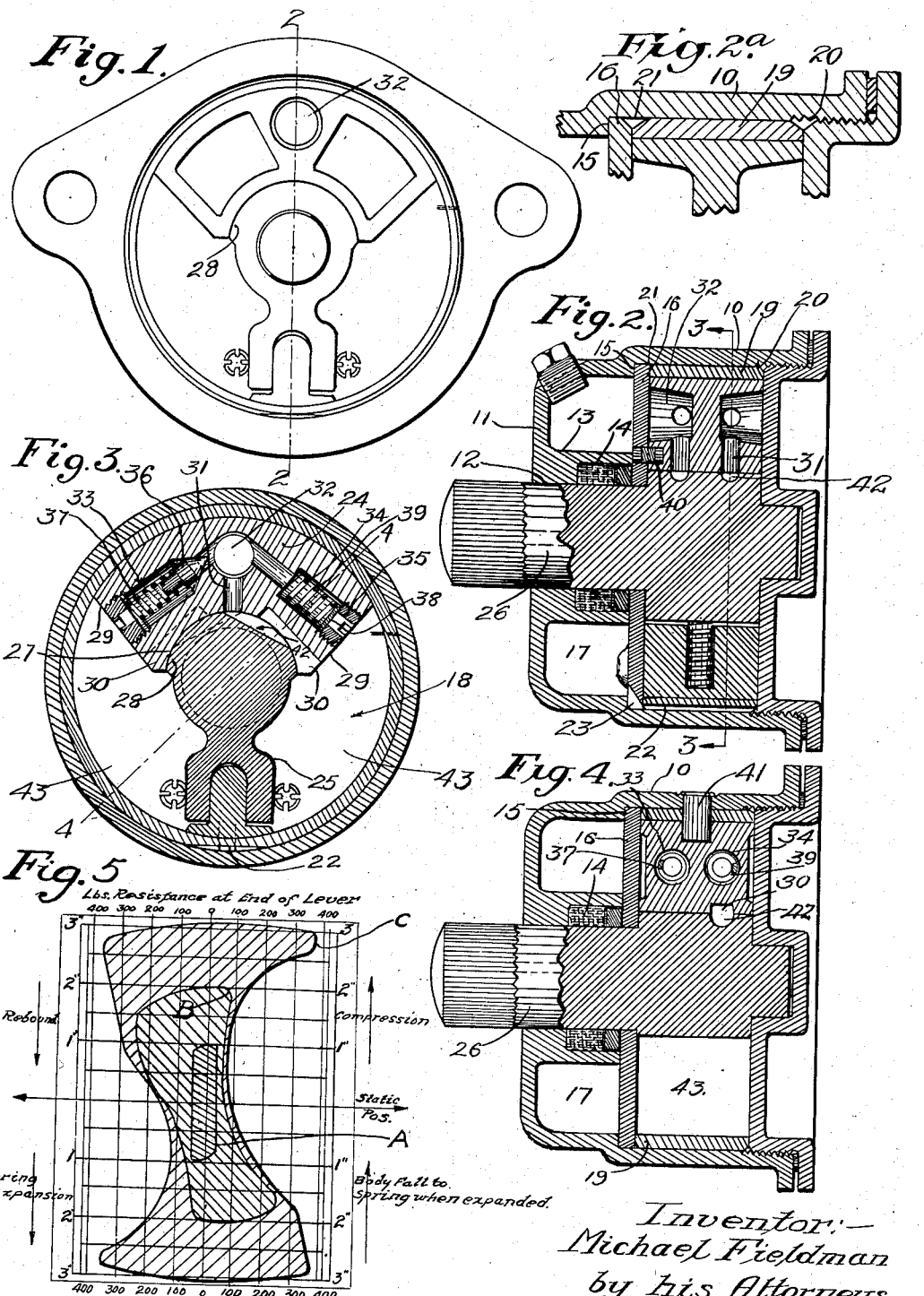
Inventor:—
Michael Fieldman
by his Attorneys
Howson & Howson

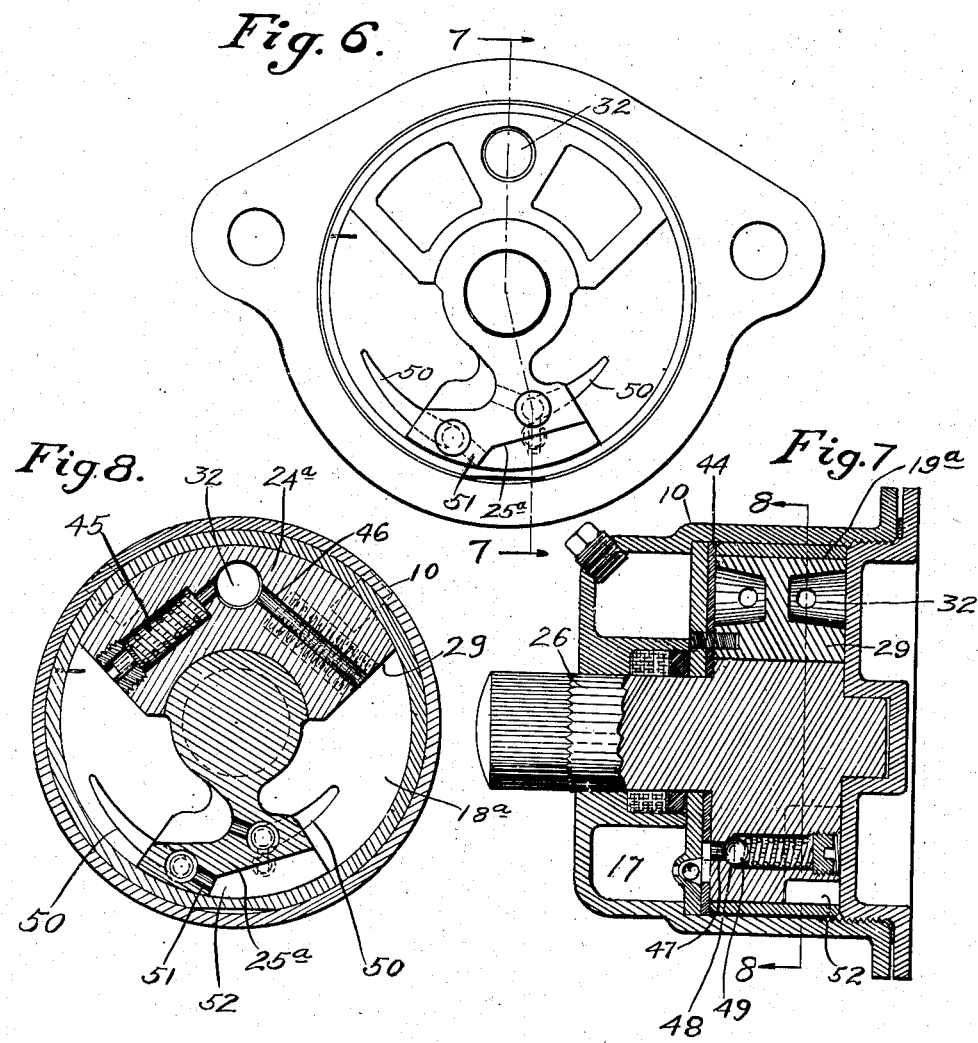

Patented Feb. 12, 1935

1,991,201

UNITED STATES PATENT OFFICE 1,991,201

HYDRAULIC SHOCK ABSORBER

Michael Fieldman, Philadelphia, Pa., assignor, by direct and mesne assignments, to Houde Engineering Corporation, Buffalo, N. Y., a corporation of New York Application July 7, 1930, Serial No. 466,319

19 Claims. (Cl. 188—89)

This invention relates to shock absorbers and more particularly to shock absorbers of the oscillatory type.

An important object of the present invention is to provide in a shock absorber of this character a construction such that the shock absorber may be very readily and cheaply produced and at the same time may operate in such fashion that during normal movements of the vehicle frame with relation to the axles or such movements as are occasioned by slight road roughness, or side sway of the vehicle, the absorber exercises a predetermined low resistance effect and when the relative movement becomes violent either as a result of dropping of the vehicle wheels into a depression in the road and the following body fall, or a meeting of these wheels with an obstruction and the following rebound as a result of compression of the springs, the resistance pressure increases sharply after a predetermined relative movement of the axles and frame to check such movement and remains substantially constant during the major portion of the rebound or falling action following the initial relative movement so that such movements are checked and the relative positions of the frame and axles rapidly restored.

A still further object of the invention is to provide an oscillatory shock absorber wherein the pressure control, during movement of the oscillatory piston in either direction, is the function of a metering groove backed by a pressure controlling valve, the metering groove and pressure-backed valve as set forth in my prior application filed July 27, 1929, Serial No. 381,512, with the additional feature that the effective area of the metering groove is varied throughout the distance through which the piston moves and during excessive movements is reduced to zero so that a desired maximum pressure may be built up.

A still further object of the invention is the provision of a construction of this character in which the arrangement is such that the metering grooves may be made effective through a desired period of oscillation of the piston.

These and other objects I attain by the construction shown in the accompanying drawings wherein, for the purpose of illustration, I have shown preferred embodiments of my invention and wherein:

Fig. 1 is an inner face view of a shock absorber constructed in accordance with my invention, the cover plate being removed;

Fig. 2 is a section on line 2—2 of Fig. 1;

Fig. 2a is an enlargement of a portion of Fig. 2, illustrating certain leakage collection grooves;

Fig. 3 is a section on line 3—3 of Fig. 2;

Fig. 4 is a section on line 4—4 of Fig. 3;

Fig. 5 is a chart showing a characteristic development of pressures in a shock absorber of this character;

Fig. 6 is a view similar to Fig. 1 showing a modified form of the invention;

Fig. 7 is a section on line 7—7 of Fig. 6;

Fig. 8 is a section on line 8—8 of Fig. 7;

Figure 11:
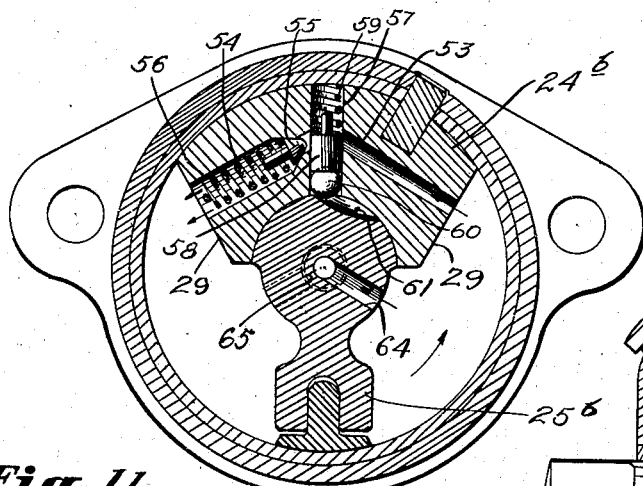
Fig. 11 is a section on line 11—11 of Fig. 9.

Referring now to the drawings, and more particularly to Figs. 1 to 4 thereof, the numeral 10 generally designates a cup-shaped casing, the bottom wall 11 of which has a central opening 12 which is extended through a tubular boss 13. The diameter of the bore of the boss is increased at 14 for a purpose presently to appear. In the same plane as the inner end of the boss, the bore of the casing 10 is enlarged at 15, thus affording a shoulder providing a seat for the outer edge of a plate 16, the inner edge of which seats upon the inner end of the boss 13 and serves to subdivide the interior of the casing into storage and working chambers 17 and 18. The circumferential wall of the working chamber is preferably defined by a bushing 19 which bushing is constructed in accordance with the directions of my prior application filed December 17, 1929, Serial No. 414,726, for Hydraulic shock absorbers, so that circumferential leakage collection grooves 20 and 21 are provided which grooves are in communication through a port 22 and notch 23 formed in the plate 16 with the storage chamber 17.

Located within the working chamber are a stationary partition 24 and an oscillating piston 25, this piston having a shaft 26 which projects through the central opening of the plate 16 and through the opening 12 to the exterior of the casing for attachment of the usual operating arm not herein shown. The inner face of the partition element 24 has an arcuately curved surface 27 against which the hub portion 28 of piston 25 has a rotating fit. From opposite end faces 29 of the partition element this arcuately curved surface 27 is formed with circumferentially-extending passages 30, each of which extends into the body for a short distance. Inwardly of the inner end of each groove 30 the partition element is provided with a vertically-extending bore 31, the upper end of which communicates with a pocket 32 at present shown as produced by recessing the side faces of the partition element in the process of manufacture thereof. Communicating with each pocket 32 are a pair of bores 33 and 34, the outer ends of which are each enlarged and each open through an end face 29 and have seated therein an apertured plug 35. The bores 33 and 34 communicating with one pocket 32 are disposed in opposite relation with those communicating with the other pocket. Thus, one bore 33 leads from one face 29 to a pocket 32 while the other bore leads from the other face 29 to the other pocket 32. The inner end of each bore 33 is formed as a valve seat for co-action with a valve 36 which is maintained against its seat through a spring 37 extending between the plug and valve. Within each bore 34 there is a valve 38 seating against the plug 35 to close the aperture thereof, this valve being held against its seat by a spring 39. Spring 37 is a pressure-regulating spring for determining the normal minimum pressure at which the shock absorber may operate while spring 39 is of higher pressure and seats its valve 38 against all but excessive pressures in the shock absorber. The port series each including the port 31, a pocket 32 and ports 33 and 34 are spaced transversely of the partition element. The partition element is locked against rotation with relation to plate 16 as at 40 and against rotation with relation to casing 10 as at 41. The piston hub 28 has formed therein circumferentially-extending grooves 42 each of which varies in depth from end to end and each of which when the piston is in its normal or intermediate position has its inner end just communicating with the associated port 31 and its outer end overlapping the associated recess 30 for a considerable distance. Variation in the cross sectional area of grooves 42 may be accomplished in any one of a number of manners, in the present instance the groove is shown as routed and as having its base extending chordly so that the greatest cross sectional area of the groove occurs at the center thereof.

In operation of a shock absorber of this character if movement of the piston from its normal position toward either of the end faces 29 is relatively slow so that the fluid displaced by the reduction of the pressure chamber 43 at either side of the piston may pass through the effective portion of groove 42 without creating a greater pressure than that necessary to unseat valve 36 against the action of its spring 33 then the pressures built up within the shock absorber are substantially those indicated by the graph line "A" of the chart of Fig. 5. Assuming that the movement of the piston is more rapid so that an increase in pressure is necessary for delivering of the displaced fluid beyond that necessary to unseat valve 36 but that the piston movement is insufficient to shift the effective groove 42 to a position where it does not remain in overlapping relation to the recess 30 of the partition, then the pressures built up will be substantially represented by the graph line "B" of this figure. With a still further increase in speed of movement and in the distance through which the piston moves, the movement of the piston carries the outer end of the operative groove 42 beyond the inner end of the associated recess 30. Until this occurs, the pressures built up in the shock absorber are only those required for displacement of the fluid through the metering groove 42 and the valve port. After it occurs, however, there is no outlet for fluid from the effective pressure chamber to the other of the pressure chambers which at this time might be referred to as a low pressure chamber and, accordingly, there is an abrupt rise in pressure as indicated on the graph line "C" of Fig. 5. This rise in pressure will continue until the safety valve 38 opens and the built-up pressure will remain substantially static until the other of the grooves 42 comes into communication with its port 31 from which it has been displaced by the piston movement. It will be obvious that the springs 37 constitute the means for determining the minimum working pressure existing in the shock absorber during casual movements of the piston while the metering groove 42 constitutes a means for determining the built-up pressures during rapid movements of the piston until these pressures reach a predetermined value, at which time the spring 39 becomes the effective control. It will be noted that because the grooves 42 are spaced longitudinally of the axis of the piston these grooves can be constructed in overlapping relation at their inner ends, thus enabling a metering groove of considerable length to be provided in the hub which is built with maximum and minimum radii as set forth in my prior application filed June 23, 1927, Serial No. 200,812, thus enabling the finishing of the hub by an inexpensive broaching operation.

In the construction shown in Figs. 6, 7 and 8, while the general structure of the shock absorber is identical with that previously described, the metering grooves and pressure valves are transferred from the hub of the piston and the stationary partition to a wall of the working compartment 18a and to the piston 25a respectively. In the structure shown in these figures the inner face of the plate 16 is abutted by a thin plate 44 against which the bushing 19a, forming the outer wall of the working compartment, seats. The partition element 24a is provided with pockets 32 and with safety valve mechanism 45 corresponding to that previously described communicating with these pockets and each opening through one end face of the partition. Each pocket is in communication with the opposite end face of the partition element through a port 46. The piston 25a is formed with transversely-extending ports 47, each opening through one side face of the piston and each formed to provide a valve seat 48 against which is spring-seated a pressure-regulating valve 49. Each port 47 in the normal position of the piston communicates with the inner end of a metering groove 50 at present shown as constructed by slotting the thin plate 44 hereinbefore mentioned with an arcuate slot tapering from end to end. Each port 47 at its inner end communicates with a port 51 opening through the rear face of the piston as regards the direction in which the associated metering groove 50 extends, these ports 51 being each shown as partially formed by recessing the piston at 52. It will be noted that the recesses 52 are formed at the opposite face of the piston from that at which the associated ports 47 open so that the side faces of the piston in alignment with each groove 50 present an unbroken surface. This is important as the effective length of the metering grooves 50 may not be greater than the unbroken surface presented by the piston in alignment therewith.

Operation of a shock absorber of this construction is identical with the operation previously described.

Figure 10:
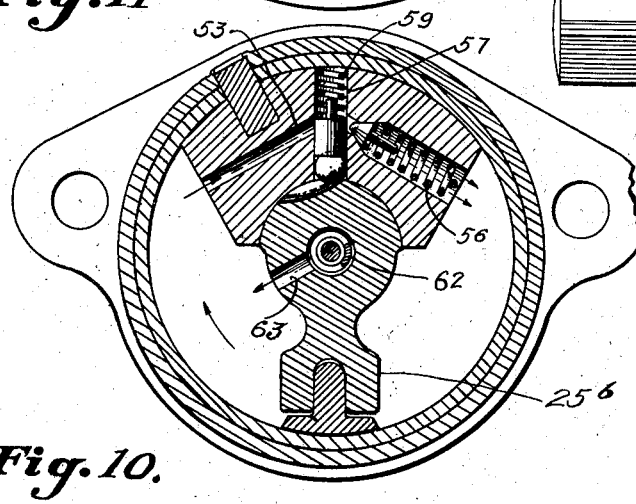
Fig. 10 is a section on line 10—10 of Fig. 9.
Figure 9:
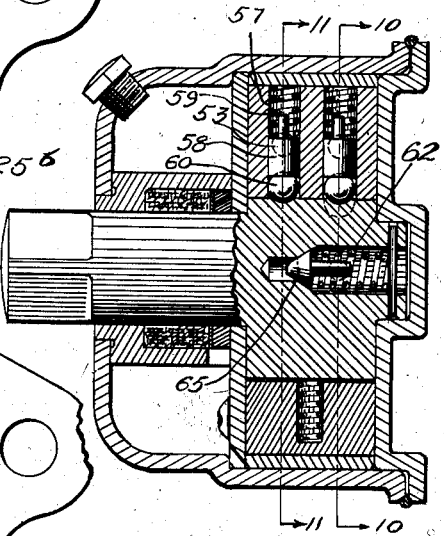
Fig. 9 is a vertical sectional view through a still further modified form of the invention.

In the form of the invention shown in Figs. 9 to 11, the effective area of the metering groove is valve-controlled. In this structure the general arrangement is that of the form shown in Figs. 1 to 4. The partition element 24b and piston 25b, however, are of modified construction. The partition element 24b is formed with a pair of ports 53 connecting the end faces 29 thereof, these ports each having one end thereof enlarged at 54 and having the inner end of the enlargement formed as a seat for the valve 55 maintained against its seat by a pressure-regulating spring 56. Each port 53 adjacent the inner end of the enlargement and in the smaller portion of the port is interrupted by a substantially radial bore 57 within which is arranged a piston valve 58 urged inwardly by a spring 59. The inner end of the piston valve 58 abuts a ball 60 operating in a groove 61 formed in the hub of the piston 25b, this groove varying in depth from end to end so that as the piston oscillates the valve 58 is shifted longitudinally of the bore and tends to open or close the port 53 and thus provide the variable metering port necessary to production of the desired type of operation hereinbefore described. Since the ports 53 are transversely spaced in the partition element, the cam grooves 61 controlling the action of the piston valve 58 may be made to overlap and the same general advantages may, accordingly, be obtained as are obtained by the structure shown in Figs. 1 to 4. The construction shown in these figures, furthermore, illustrates the fact that it is not necessary that two relief valves be employed and that it is not necessary to mount these relief valves in the partition element. In this construction the piston is provided with an axial bore 62 communicating with transversely-spaced radial ports 63 and 64 opening through opposite sides of the piston. Between these ports a spring-seated relief valve 65 controls the flow and permits flow in only one direction so that there is no relief for excessive pressures during movement of the piston in one direction. Where a single relief valve is provided, it will be provided so that it affords the relief during piston movements resulting from operation of the springs. It will be obvious that where two relief valves are employed, springs of different pressure may be associated with these valves so that the relief valves will act at different pressures.

From the foregoing it will be obvious that a shock absorber including the desired characteristics and of the oscillating type may be produced in a number of different fashions without in any manner departing from my invention and I, accordingly, do not limit myself to the specific arrangement hereinbefore set forth except as hereinafter claimed.

I claim:

1. In a shock absorber, a casing providing a working chamber, a partition element in the chamber, an oscillatory piston likewise in the chamber and combining with the partitioning element to subdivide the chamber into pressure compartments, a pair of fluid transfer connections constituting the sole means of communication between said compartments at pressures below a predetermined safety relief pressure and each including a metering port varying in cross sectional area as the piston oscillates, and a spring-seated, pressure-regulating check-valve controlling flow through each connection after passage of fluid through said metering port.

2. In a shock absorber, a casing providing a working chamber, a partition element in the chamber, an oscillatory piston likewise in the chamber and combining with the partitioning element to subdivide the chamber into pressure compartments, fluid transfer connections constituting the sole means of communication between said compartments at pressures below a predetermined safety relief pressure and each including a metering port varying in cross sectional area as the piston oscillates and closing after oscillation of the piston from its normal position through a predetermined distance, and a spring-seated, pressure-regulating check-valve controlling flow through each connection after passage of fluid through said metering port.

3. A device as claimed in claim 1 wherein means are provided for varying the cross sectional area of the metering port comprising a valve, and piston-actuated means for shifting said valve.

4. A device as claimed in claim 2 wherein means are provided for varying the cross sectional area of the metering port comprising a valve, and piston-actuated means for shifting said valve.

5. A device as claimed in claim 1 wherein the connections are formed in the partition and a piston cammed valve is associated with each connection to vary the effective area of a portion thereof and thereby provide the metering port.

6. A device as claimed in claim 2 wherein the connections are formed in the partition and a piston cammed valve is associated with each connection to vary the effective area of a portion thereof and thereby provide the metering port.

7. A device as claimed in claim 1, wherein the connections are formed in the piston and the metering ports include grooves formed in the walls of the working chamber.

8. A device as claimed in claim 2 wherein the connections are formed in the piston and the metering ports include grooves formed in the walls of the working chamber.

9. In a shock absorber, a casing providing a working chamber, a partition element in the chamber, an oscillatory piston likewise in the chamber and combining with the partitioning element to subdivide the chamber into pressure compartments, a pair of fluid transfer connections constituting the sole means of communication between said compartments and each including a metering port varying in cross sectional area as the piston oscillates, and a spring-seated, pressure-regulating check-valve controlling flow through each connection after passage of fluid through said metering port.

10. In a shock absorber, a casing providing a working chamber, a partition element in the chamber, an oscillatory piston likewise in the chamber and combining with the partitioning element to subdivide the chamber into pressure compartments, fluid transfer connections constituting the sole means of communication between said compartments and each including a metering port varying in cross sectional area as the piston oscillates and closing after oscillation of the piston from its normal position through a predetermined distance, and a spring-seated, pressure-regulating check-valve controlling flow through each connection after passage of fluid through said metering port.

11. In a shock absorber a casing providing a working chamber, an oscillatory piston dividing the chamber into a pair of pressure compartments, a fluid transfer connection providing communication between said compartments and including a metering port varying in cross-sectional area as the piston oscillates, said transfer connection comprising a duct formed in the piston and a groove cooperating therewith and formed in a wall of the working chamber, and a spring seated pressure regulating valve controlling flow through the duct.

12. A device as claimed in claim 9 wherein the metering ports are spaced longitudinally of the piston axis and the means controlling the effective area of the metering port include grooves in the piston hub which are similarly spaced and have their ends in overlapping relation.

13. A device as claimed in claim 10 wherein the metering ports are spaced longitudinally of the piston axis and the means controlling the effective area of the metering port include grooves in the piston hub which are similarly spaced and have their ends in overlapping relation.

14. A device as claimed in claim 9 wherein the metering port is formed by co-action of a groove in the hub of the piston with the confronting wall of the partition element.

15. A device as claimed in claim 10 wherein the metering port is formed by co-action of a groove in the hub of the piston with the confronting wall of the partition element.

16. A device as claimed in claim 9 wherein the metering ports are formed by co-action with grooves formed in the hub of the piston with the confronting wall of the partition element and said grooves are spaced longitudinally of the axis of the piston.

17. A device as claimed in claim 10 wherein the metering ports are formed by co-action with grooves formed in the hub of the piston with the confronting wall of the partition element and said grooves are spaced longitudinally of the axis of the piston.

18. A device as claimed in claim 9 wherein the metering ports are formed by co-action of grooves formed in one of confronting faces of the piston hub and partition and co-action of said grooves with the confronting face of the other of said elements.

19. A device as claimed in claim 10 wherein the metering ports are formed by co-action of grooves formed in one of confronting faces of the piston hub and partition and co-action of said grooves with the confronting face of the other of said elements.

MICHAEL FIELDMAN.